(12) United States Patent
Plöchinger (10) Patent No.: US 6,178,818 B1
(45) Date of Patent: Jan. 30, 2001

(54) CAPACITIVE FILLING LEVEL SENSOR (76) Inventor: Heinz Plöchinger, Ina-Seidel-Weg 4, D-82319 Starnberg (DE)

( * ) Notice: Under 35 U.S.C. 154(b), the term of this patent shall be extended for 0 days.

(21) Appl. No.: 08/945,996

(22) PCT Filed: May 8, 1996

(86) PCT No.: PCT/EP96/01929

§ 371 Date: Dec. 3, 1997

§ 102(e) Date: Dec. 3, 1997

(87) PCT Pub. No.: WO96/35929

PCT Pub. Date: Nov. 14, 1996

(30) Foreign Application Priority Data

May 8, 1995 (DE) .............................. 195 16 809

(51) Int. Cl.[7] .............................. G01F 23/00; H01G 5/012
(52) U.S. Cl. .................. 73/304 C; 73/290 R; 73/304 R; 361/284
(58) Field of Search .............................. 73/304 C, 290 R, 73/304 R; 361/284, 280

(56) References Cited

U.S. PATENT DOCUMENTS

| 5,042,299 | * | 8/1991 | Wells | ................................. 73/304 C |
| 5,049,878 | * | 9/1991 | Stern | ................................. 340/870.4 |
| 5,860,316 | * | 1/1999 | Berrill | ................................. 73/304 C |

FOREIGN PATENT DOCUMENTS

| 3902107A1 | 8/1990 | (DE) | ......................................... 23/26 |
| 4025400C1 | 8/1990 | (DE) | ......................................... 23/26 |
| WO 92/18856 | 10/1992 | (WO) | ......................................... 27/6 |

* cited by examiner

*Primary Examiner*—Hezron Williams
*Assistant Examiner*—Dennis S. Loo
(74) *Attorney, Agent, or Firm*—Duft, Graziano & Forest, P.C.

(57) ABSTRACT

A capacitive filling level sensor has a first capacitive sensor element arranged close to a fluid whose filling level is to be detected, a second capacitive sensor element arranged close to a fluid whose filling level is to be detected, and a switched-capacitor measuring circuit, which is connected to the first and second capacitive sensor elements and which detects the capacitance values thereof. The switched-capacitor measuring circuit produces in response to the detected capacitance values a signal indicative of the filling level. The first capacitive sensor element and the second capacitive sensor element are each defined by two wires of a ribbon cable having at least five wires, the fifth wire extending between the wires which define the capacitive sensor elements, and being connected to ground.

11 Claims, 6 Drawing Sheets

CAPACITIVE FILLING LEVEL SENSOR

FIELD OF THE INVENTION

The present invention refers to a capacitive filling level sensor.

BACKGROUND OF THE INVENTION

Filling level sensors known from the prior art are provided with a capacitive sensor element which is arranged in a fluid whose filling level is to be detected. Such known filling level sensors additionally comprise evaluation circuits by means of which a signal indicative of the filling level is produced on the basis of the detected capacitance of the capacitive sensor -element.

These known filling level sensors are disadvantageous insofar as the electrodes of the capacitive sensor elements must be protected. Normally, this means that the electrodes are coated with a protective material. Such protective coatings are often porous so that the fluid whose filling level is to be detected can come into contact with the electrodes of the sensor element, the electrodes consisting e.g. of copper.

Such contact is undesirable especially in cases of use where the filling level of a food fluid, e.g. milk in a respective tank, is to be detected. In this case, the food fluid to be detected may become contaminated or a change in the taste of such foodstuffs may occur.

A further disadvantage of these known filling level sensors is that their capacitive sensor elements, i.e. their electrodes coated with a protective material, have a comparatively complicated structure necessitating an expensive multi-step production.

Still another disadvantage of these known filling level sensors is that part of the fluid whose filling level is to be detected adheres to the protective coatings, whereby measure errors are caused and an incorrect filling level is indicated.

DE 40 25 400 C1 refers to a method and a probe arrangement for dielectric constant-compensated capacitive filling level measurement. This known device comprises a filling level measuring probe as well as a compensation probe which are immersed in a material contained in a receptacle such that they extend parallel to one another and that their longitudinal direction extends parallel to the inner wall of the receptacle. By means of a RF-generator, which is connected to the measurement capacitance, and a measurement current rectifier, the measurement capacitance of the filling level measuring probe and of the compensation probe, respectively, is determined and the filling level is derived therefrom.

DE 39 02 107 A1 refers to a capacitive level gauge comprising a measuring capacitor consisting of at least one measuring electrode and at least one earth electrode implemented as condutive wires, stranded conductors or ribbons, which extend in parallel, juxtaposed relationship and which are separated from one another and from the medium to be measured by means of a dielectric insulation. In FIGS. 2 to 7 various embodiments of the measuring capacitors are shown.

WO 92/18856 refers to a switched capacitor circuit and deals with the measurement of the electric conductivity of liquids.

SUMMARY OF THE INVENTION

It is the object of the present invention to further develop a filling level sensor in such a way that it can be produced more easily and at a lower price with sufficient protection of the electrodes of the capacitive sensor element of the filling level sensor, and in such a way that measurement errors are avoided when the filling level sensor is in operation.

The present invention provides a capacitive filling level sensor having a first capacitive sensor element arranged close to a fluid whose filling level is to be detected, a second capacitive sensor element arranged close to a fluid whose filling level is to be detected, and a switched-capacitor measuring circuit which is connected to the first and second capacitive sensor elements and which detects the capacitance values thereof. The switched-capacitor measuring circuit produces in response to the detected capacitance values a signal indicative of the filling level. The first capacitive sensor element and the second capacitive sensor element are each defined by two wires of a ribbon cable having at least five wires, the fifth wire extending between the wires which defined the capacitive sensor elements, and being connected to ground.

Other objects, features and advantages of the present invention will become apparent upon consideration of the following detailed description and the accompanying drawings.

BRIEF DESCRIPTION OF THE DRAWINGS

In the following, preferred embodiments of the present invention will be explained in detail on the basis of the drawings enclosed, in which:

FIG. 4a shows a second preferred embodiment of the present invention;

FIG. 4b shows a cross-sectional representation of the ribbon cable used in FIG. 4a;

DESCRIPTION OF THE PREFERRED EMBODIMENTS

Figure 1:
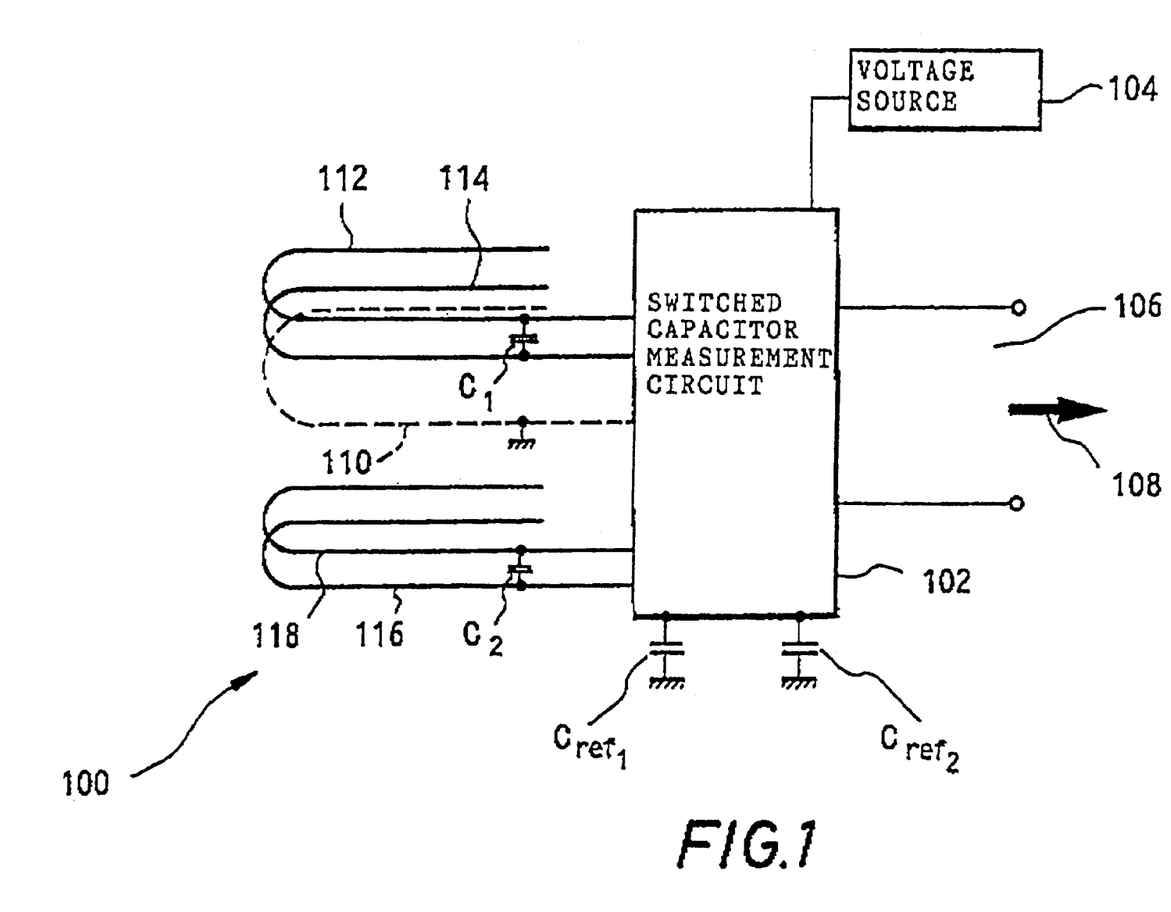
FIG. 1 shows a block diagram of a preferred embodiment of the filling level sensor according to the present invention.
Figure 2:
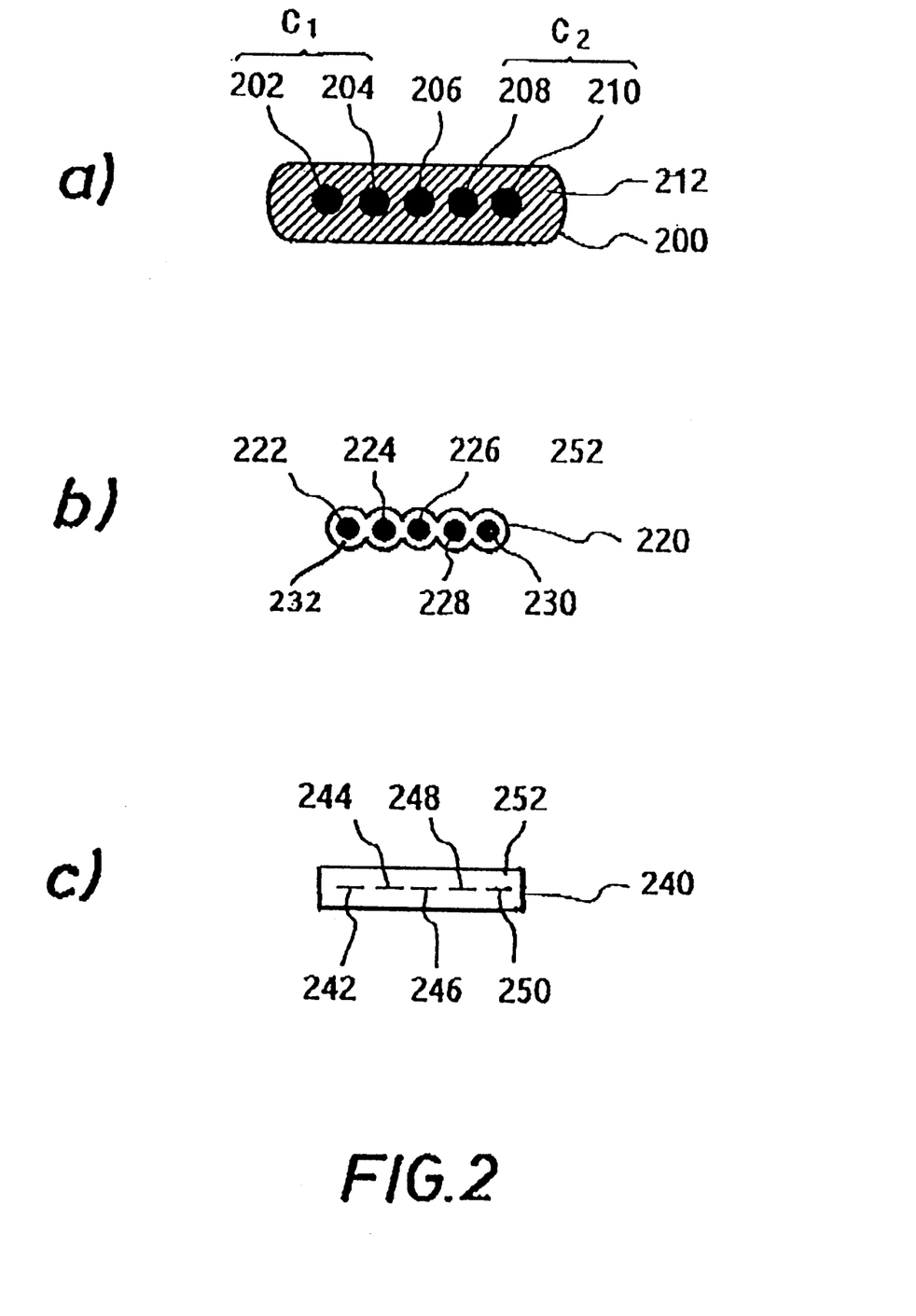
FIGS. 2a to 2c show cross-sectional representations of ribbon cables used in connection with the subject matter of the present invention.

In FIG. 1, a capacitive filling level sensor is designated by reference numeral 100.

In this preferred embodiment, the filling level sensor 100 comprises a first capacitive sensor element $C_1$ and a second capacitive sensor element $C_2$. The respective electrodes of the sensor elements are connected to an evaluation means 102, which is a switched-capacitor measuring circuit in the present embodiment. The filling level sensor also includes a voltage source 104 which is connected to the evaluation means 102 and which serves to alternately change the polarity of the respective electrodes of the sensor elements $C_1$ and $C_2$. This means that the respective electrodes of the sensor elements $C_1$ and $C_2$ have alternately applied thereto voltages of different polarities by the voltage source 104.

The filling level sensor according to the present invention comprises to reference capacitors $C_{ref1}$ and $C_{ref2}$ which are connected to the evaluation circuit 102.

Attention is drawn to the fact that the respective switch means, which are required for the above-described change of polarity of the electrodes, are provided in the voltage source 104 as well as in the measuring circuit 102In view of the fact that this is a configuration which is known per se, a more detailed description can be dispensed with.

With regard to an example of a switched-capacitor measuring circuit, reference is made to the international patent application WO 92/18856 whose disclosure content is herewith incorporated by this cross reference.

The switched-capacitor measuring circuit 102 generates at its output 106 an output signal (arrow 108) indicating the filling level of the fluid in which the capacitive sensor elements $C_1$ and $C_2$ are arranged.

According to the present invention, the sensor elements $C_1$ and $C_2$ shown in FIG. 1 are defined by a ribbon cable. Such ribbon cables are known per se among those skilled in the art. In FIG. 1, the ribbon cable is indicated by the five conductors 110, 112, 114, 116 and 118.

In FIG. 2a–c, a plurality of ribbon cables 200, 220 and 240 is shown; the ribbon cables can be used in the embodiment shown in FIG. 1.

The ribbon cable 200 in FIG. 2a comprises five wires 202, 204, 206, 208, 210. In the preferred embodiment of the present invention, the capacitive sensor element $C_1$ is formed by the two wires 202 and 204, which extend in parallel and which are located on the outer left in FIG. 2a, and the capacitive sensor element $C_2$ is formed by the two wires 208 and 210, which extend in parallel and which are located on the outer right in FIG. 2a. The five wires 202, 204, 206, 208 and 210 are surrounded by a protective coating 212.

The wire 206 is connected to ground so as to decouple the two capacitive sensor elements $C_1$ and $C_2$. In FIG. 1, this is shown by the ground conductor 110.

The ribbon cable 220 shown in FIG. 2b corresponds substantially to that shown in FIG. 2a. The ribbon cable 220 comprises five wires 222, 224, 226, 228 and 230. The shape of the protective coating 232 of the ribbon cable 220 is adapted to the wires 222 to 230.

Also the ribbon cable 240, which is shown in FIG. 2c, comprises five wires 242, 244, 246, 248 and 250. A protective coating 252 encompasses the wires 242 to 250. In this ribbon cable 250, the wires 242 to 250 are embedded in laminae of the protective coating.

The ribbon cables used in accordance with the present invention are provided with a protective coating to which the fluid whose filling level is to be detected does not adhere so that no measurement errors will occur when the filling level sensor according to the present invention is used.

A preferred material for the protective coating is Teflon. However, other materials to twlii6h the fluid whose filling level is to be detected does not adhere can be used as a protective coating as well.

According to a preferred embodiment of the present invention, the ribbon cable including the capacitive sensor elements can be arranged in the form of a loop within the fluid so that both ends of the ribbon cable project beyond the fluid whereby a continuous insulation of the capacitive sensor elements in the fluid is guaranteed.

It is, however, also possible to introduce one end of the ribbon cable in the fluid, provided that the respective end arranged in the fluid is insulated.

By means of the arrangement of the type shown in FIG. 1 environmental influences, such as temperature variations, acting on the sensor elements $C_1$, $C_2$ can be compensated for. This is done in a manner known per se by means of a switched-capacitor measuring circuit in connection with the voltage source 104 which alternately applies voltages of different polarities to the sensor elements $C_1$ and $C_2$.

The advantage of the subject matter of the present invention resides in the fact that the capacitive sensor elements $C_1$, $C_2$ can be formed simply and at a low price because a ribbon cable is used for realizing the sensor elements in a ribbon cable, uniform distances between the individual wires are guaranteed quite naturally so that, when the subject matter of the present invention is used, the capacitance values will not change due to inaccuracies of the indiviudal electrode distances.

Reference is made to the fact that the present invention is not limited to the use of a five-wire ribbon cable, but that different ribbon cables with different numbers of wires can be used depending on the selected configuration of the filling level sensor according to the present invention.

Instead of the two sensor elements described hereinbefore, it is also possible to use more than two sensor elements; in this case, a ribbon cable comprising a plurality of wires must be used and attention must be paid to the fact that the individual wires forming an individual sensor element are decoupled from one another by a ground conductor.

In FIG. 3a, a preferred embodiment of the present invention is shown. The filling level sensor according to the present invention is generally designated by reference numeral 300.

The filling level sensor 300 comprises a screw-in housing 302. By means of this screw-in housing 302, the filling level sensor 300 according to the present invention can be fastened to a receptacle, e.g. a tank, in such a way that the filling level of the fluid contained in the receptacle can be detected.

A connector arrangement 304 is provided for establishing the respective electrical and signal-carrying connections to an external circuit arrangement, e.g. a display unit and an external power supply (neither of them shown).

Via conductors 306, the connector arrangement 304 is connected to a circuit board 308, e.g. a printed circuit board. On the circuit board 308 a so-called ASIC ciruit 310 is provided (ASIC=application specific integrated circuit) by means of which the switched-capacitor measuring circuit, which has already been described on the basis of FIG. 1, is implemented.

On the back of the circuit board 308 (on the main surface of the circuit board 308 located opposite the ASIC circuit 310) a so-called fastening and stiffening rail 312 is secured in position. In the embodiment shown in FIG. 3a, the rail 312 is produced from a plastic material. The rail 312 is secured in position in such a way that it extends from the circuit board beyond the screw-in housing 302 so that the end of the rail 312 which is remote from the circuit board 308 extends into the receptacle containing the fluid whose fluid level is to be detected.

The two main surfaces of the rail 312 have secured thereto a ribbon cable 314. In the embodiment shown, the ribbon cable 314 is e-g. glued on. As can be seen from FIG. 3a, the ribbon cabl-314 is secured to both main surfaces of the rail 312 so that the ribbon cable 314 is arranged in the fluid in the form of a loop. One end of the ribbon cable is connected via a conductor 316 to the ASIC circuit 310 on the circuit board 308. The other end of the ribbon cable 314 is unconnected.

This embodiment of the rail 312 and of the ribbon cable 314 is shown more clearly on the basis of FIG. 3b.

FIG. 3c shows an alternative embodiment of the arrangement of the rail 312 and of the ribbon cable 314.

The rail 312 is implemented as a tubular component having a square cross-section, the ribbon cable being arranged on two opposite surfaces of the rail.

It is apparent that, in addition to the embodiments of the arrangement of the rail and of the ribbon cable described in FIGS. 3b and 3c, also other arrangements are possible and that the present invention is not limited to the arrangements described.

On the basis of FIG. 4a, a further embodiment of present invention is shown. Reference is made to the fact that like reference numerals have been used to designate components which are identical in FIG. 3a and in FIG. 4a.

Figure 3:
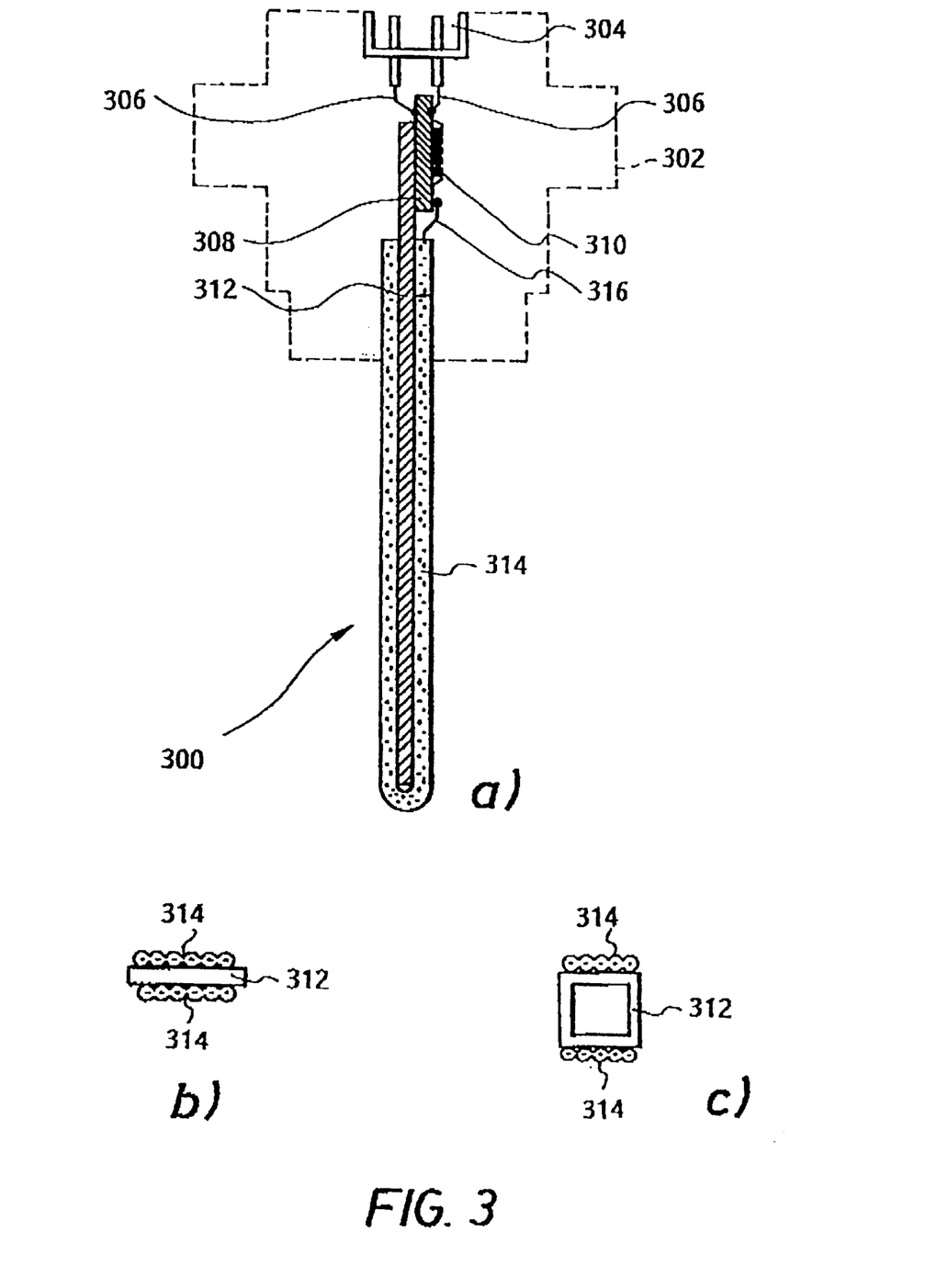
FIG. 3a shows a first preferred embodiment of the present invention.
FIGS. 3b and 3c show cross-sectional representations of examples of the combined arrangement of the ribbon cable and of the fastening and stiffening rail.
Figure 4:
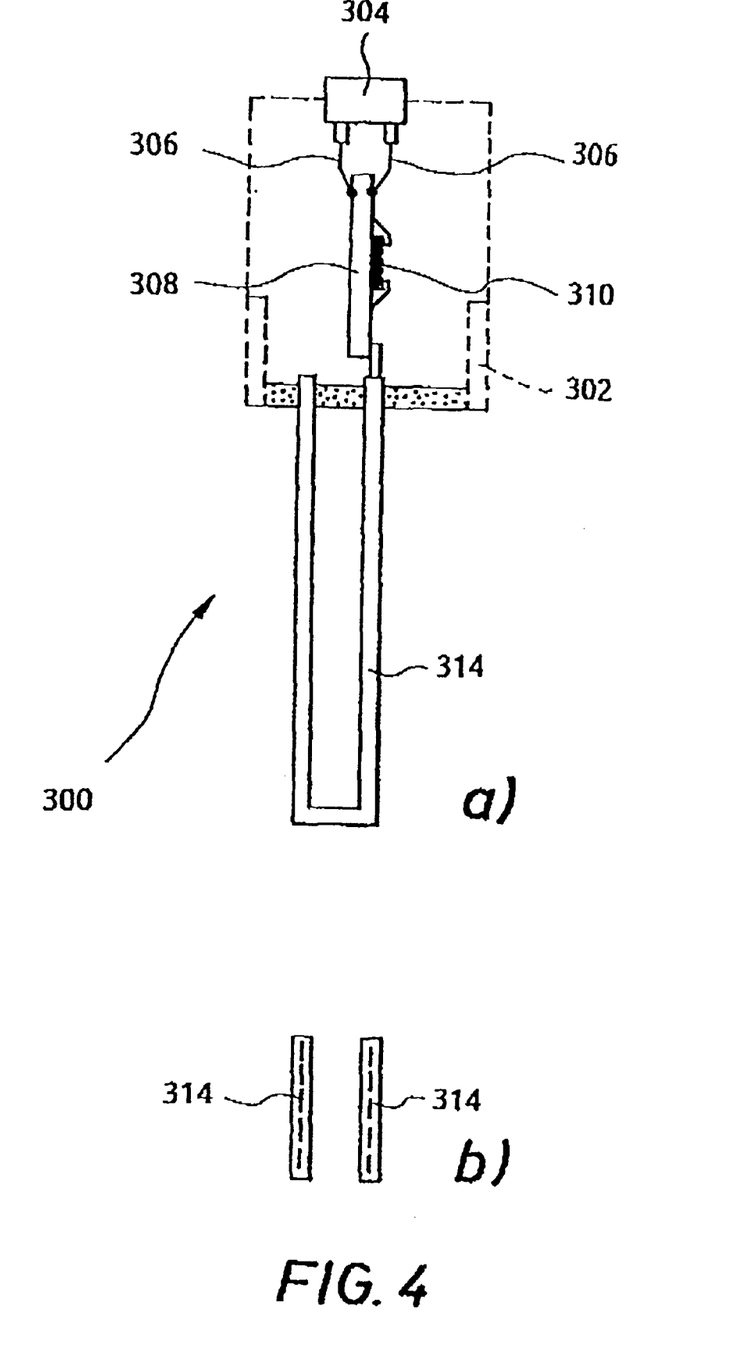

The embodiment shown in FIG. 4 essentially differs from that shown in FIG. 3 insofar as the fastening and stiffening rail has been dispensed with.

FIG. 4b shows a cross-section of a ribbon cable which is preferably used in the embodiment shown in FIG. 4a. The ribbon cable shown in FIG. 4b corresponds to the ribbon cable shown in FIG. 2c.

Figure 5:
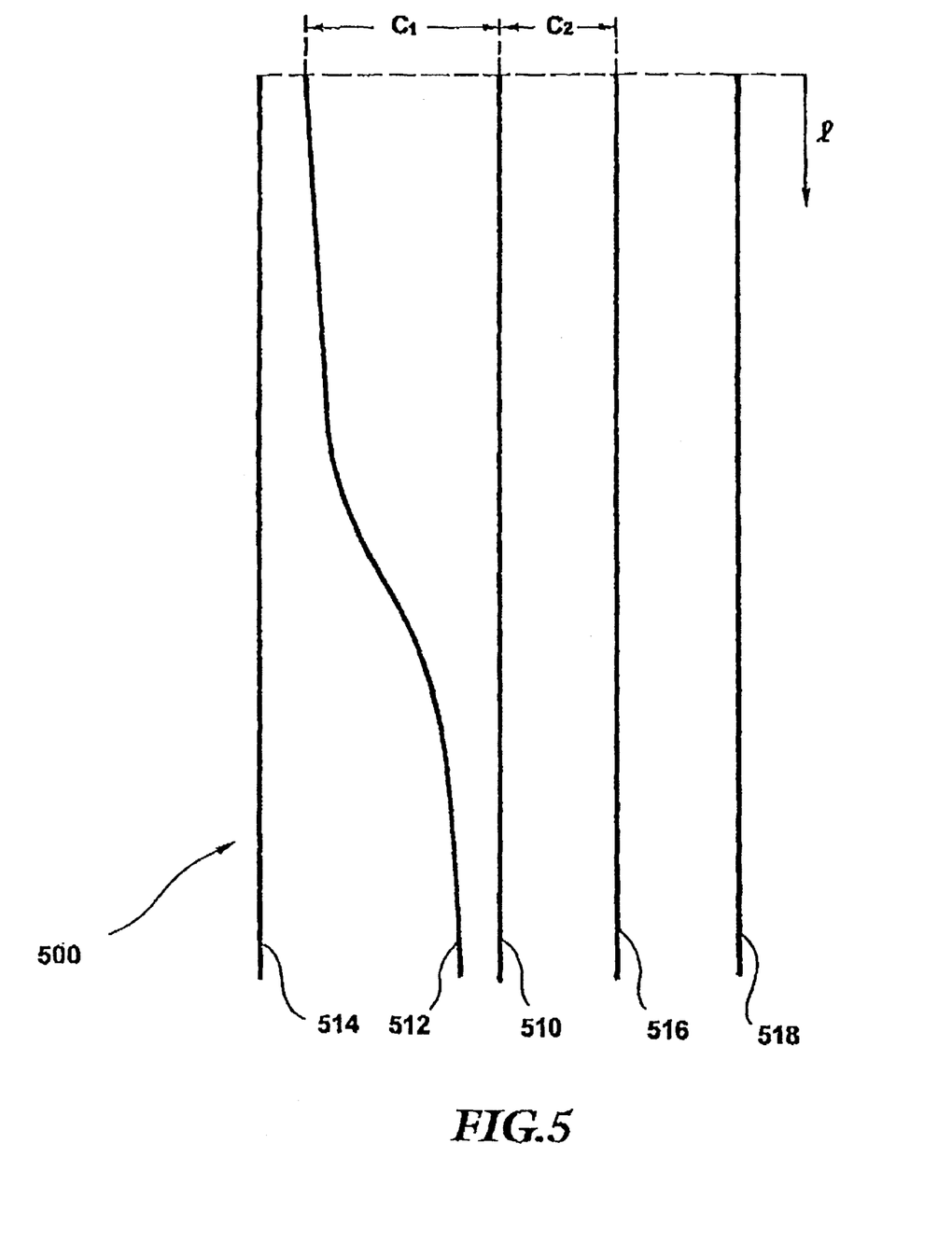
FIG. 5 shows a longitudinal section through a special ribbon cable.

FIG. 5 shows a longitudinal section through a five-wire ribbon cable whose central wire 510 and whose two outer wires 514, 518 are each connected to ground potential. A respective measuring wire 516, 512 extends between the central wire 510 and each of the two outer wires 514, 518. As in the case of the previously described embodiments, the measuring wire 516 extends at a constant mutual distance from the central wire 510 and the outer wire 518 associated therewith. However,—the distance between-be measuring wire 512 and the central wire, with which the measuring wire 512 here defines a capacitive sensor element $C_1$, changes along the length l of the ribbon cable 500. In the embodiment shown in the present connection, the capacitance variation per unit length, which is covered by the fluid to be measured, is locally dependent. The distance between the measuring wire 512 and the central wire 510 can be adjusted so as to achieve a practically arbitrary linearization of the indication of the filling amount of a receptacle having a non-rectangular cross-section, such as e.g. a circular cross-section, so that the capacitance detected corresponds linearly to the filling amount and no longer linearly depends on the filling level, as has been the case with the preceding embodiments.

In the embodiment according to FIG. 5, the distance between the measuring wire 512, which is associated with the first capacitance, and the central wire 510 varies, whereas the distance of the other measuring wire 516 is constant.

Figure 6:
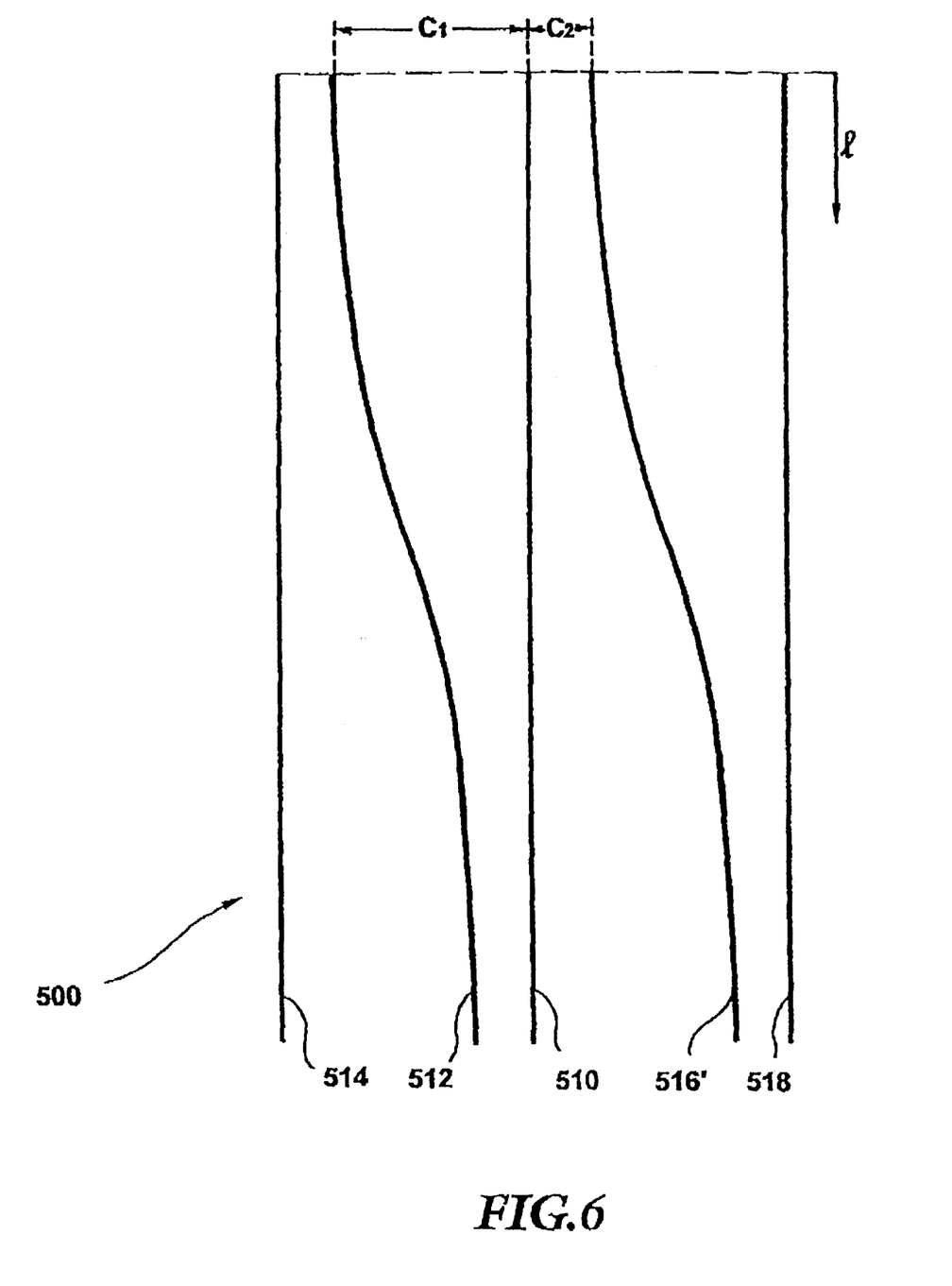
FIG. 6 shows a longitudinal section through a further ribbon cable.

In the embodiment of the ribbon cable according to FIG. 6, the distance between the measuring wire 512, which is associated with the first capacitance, and the central wire 510 as well as the distance between the other measuring wire 516', which is associated with the second capacitance, and the central wire 510 change so that the two capacitances $C_1$, $C_2$ change by locally-dependent, opposite-sense values in response to a detected incremental change of the filling level. In general, the two capacitances $C_1$, $C_2$ have here a non-linear characteristic in relation to the location. The characteristic curves have different steepnesses depending on the filling level.

In each of the above-described embodiments of the capacitive filling level sensor according to the present invention, the ribbon cable is provided with an insulation and arranged in the interior of the receptacle in the fluid. If the receptacle consists, however, of non-shielding materials, i.e. of non-conductive materials, such as plastic materials, it is also possible to arrange the ribbon cable on the outer surface of the receptacle; in this case, it will not be absolutely necessary to provide the wires of the ribbon cable with a mutual insulation. However, for reasons of practicability, at least one strip of insulating material will normally be arranged also in tits embodiment of the filling level sensor on the side of the ribbon cable facing away from the receptacle so as to avoid a falsification of the measuring result caused by unintentional contact.

What is claimed is:

1. A capacitive filling level sensor, comprising:

a first capacitive sensor element arranged sufficiently close to a fluid whose filling level is to be detected so that the fluid influences the capacitance of said first sensor;

a second capacitive sensor element arranged sufficiently close to a fluid whose fillling level is to be detected so that the fluid influences the capacitance of said second sensor;

a switched-capacitor measuring circuit which is connected to said first and second capacitive sensor elements and which detects the capacitance values thereof, said measuring circuit producing in response to the detected capacitance values a signal indicative of the filling level; and wherein said first capacitive sensor element and said second capacitive sensor element are each defined by two wires of a ribbon cable comprising at least five wires, the fifth wire extending between the wires which define the capacitive sensor elements, and being connected to ground.

2. A capacitive filling level sensor according to claim 1, wherein said measuring circuit has a structural design of such a nature that environmental influences acting on the capacitive sensor elements will not influence said signal produced.

3. A capacitive filling level sensor according to claim 1, wherein the ribbon cable defines a loop in the fluid.

4. A capacitive filling level sensor according to claim 1, wherein the ribbon cable is produced from a material repelling the fluid.

5. A capacitive filling level sensor according to claim 4, wherein said material is Teflon.

6. A capacitive filling level sensor according to claim 1, wherein said measuring circuit is defined by an application-specific integrated circuit which is arranged on a circuit board;

said circuit board is arranged in a screw-in housing;

said screw-in housing is provided with a connector arrangement for establishing the respective electrical and signal-carrying connections to an external circuit arrangement, said connector arrangement being connected to said integrated circuit; and said ribbon cable is connected to said integrated circuit and extends from said integrated circuit beyond said screw-in housing.

7. A capacitive filling level sensor according to claim 6, wherein the ribbon cable is secured to a rail, said rail being secured to the main surface of the circuit board facing away from the integrated circuit.

8. A capacitive filling level sensor according to claim 7, wherein the rail is a tubular component having a square cross-section, the ribbon cable being arranged on two opposing surfaces.

9. A capacitive filling level sensor according to claim 1, wherein at least two wires of the ribbon cable, which define together the first or the second capacitive sensor element, extend at a distance from one another that varies along the length of the ribbon cable.

10. A capacitive filling level sensor according to claim 1, wherein, depending on the cross-sectional shape of the receptacle in which the filling level is determined, the mutual distance of the wires is chosen such that the capacitance formed by the respective capacitive sensor element is proportional to the filling amount contained in the receptacle.

11. A capacitive filling level sensor according to claim 1, wherein the ribbon cable is arranged on the outer surface of a non-conductive receptacle.

* * * * *